United States Patent

[11] 3,583,478

| [72] | Inventor | Walter Fieni<br>Paris, France |
|---|---|---|
| [21] | Appl. No. | 746,450 |
| [22] | Filed | July 22, 1968 |
| [45] | Patented | June 8, 1971 |
| [73] | Assignee | Societe Anonyme Francaise Du Ferodo<br>Paris, France |
| [32] | Priority | July 21, 1967 |
| [33] | | France |
| [31] | | 115,107 |

[54] MULTITUBE RADIATOR
6 Claims, 22 Drawing Figs.

[52] U.S. Cl............................................... 165/178,
285/158
[51] Int. Cl............................................... F28f 9/04
[50] Field of Search........................................ 165/133,
158, 180, 152, 178, 134, 153; 285/137, 200, 158

[56] References Cited
UNITED STATES PATENTS

| 1,959,464 | 5/1934 | Dryden | 165/152X |
| 2,303,416 | 12/1942 | Woods | 165/178X |
| 3,207,215 | 9/1965 | Whittell, Jr. | 165/178X |
| 3,447,603 | 6/1969 | Jones | 165/178 |
| 1,120,282 | 12/1914 | Clark | 285/137X |
| 2,240,537 | 5/1941 | Young | 285/200X |
| 3,228,456 | 1/1966 | Brown et al. | 165/180X |
| 3,326,279 | 6/1967 | Eisberg et al. | 165/133 |
| 3,332,479 | 7/1967 | Martin, Jr. | 165/158 |

*Primary Examiner*—Meyer Perlin
*Assistant Examiner*—Theophil W. Streule
*Attorney*—Waters, Roditi, Schwartz and Nissen ABSTRACT: A multitube radiator, intended for use in the air-conditioning systems of motor vehicles or for cooling engines, in which the tubes are mounted between two plates or manifolds defining covered fluid chambers or water tanks, to which pipes for the connection to the rest of the fluid circuit are connected. Each manifold has at least one flange, and a seal in the form of a ring of resilient material is inserted between the tube and the flange, so that, to fix a tube, the seal is previously placed in the flange on the manifold, and the tube, having been passed through the ring seal, is increased in diameter, providing both a mechanical connection and a fluid-tight seal.

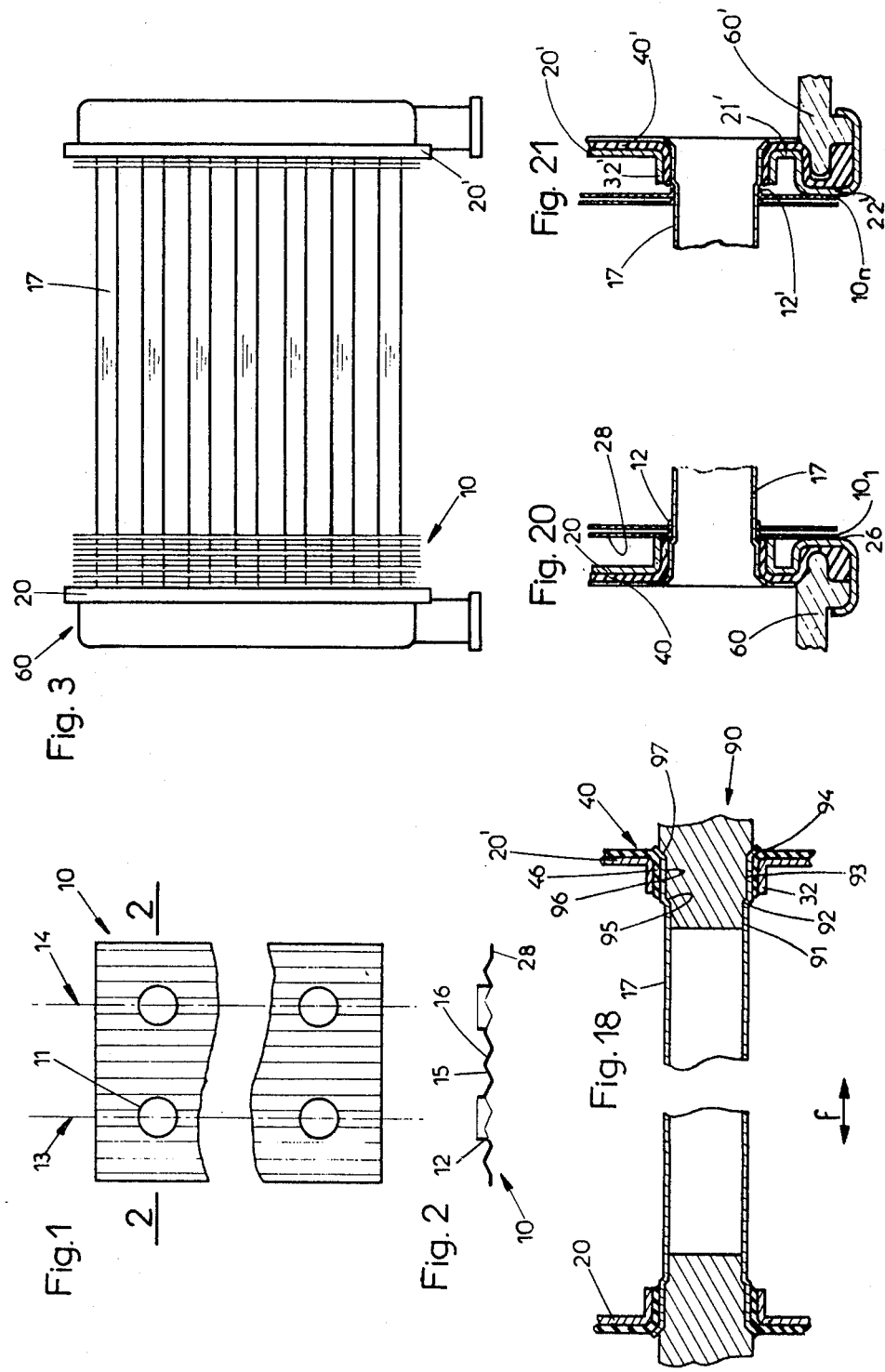

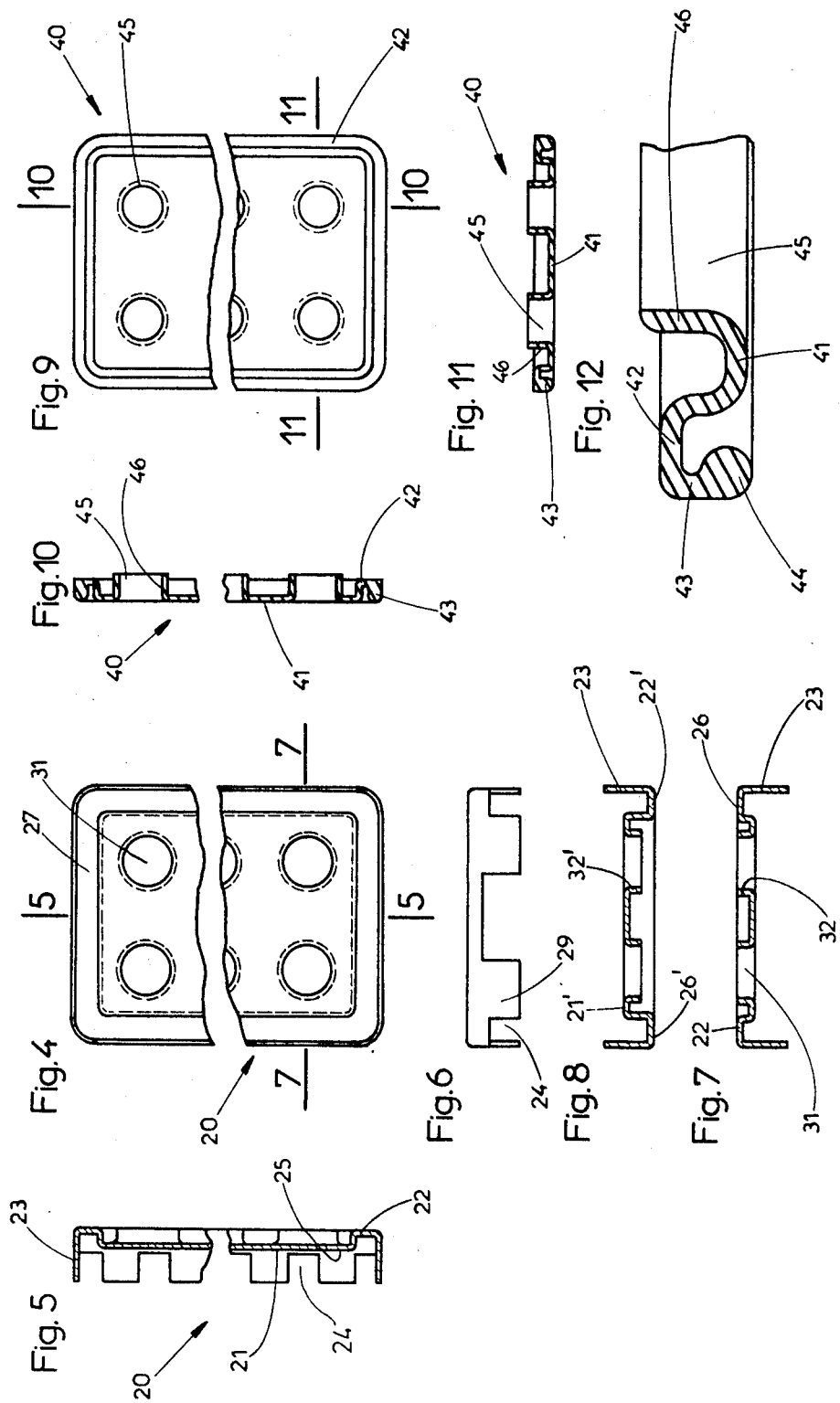

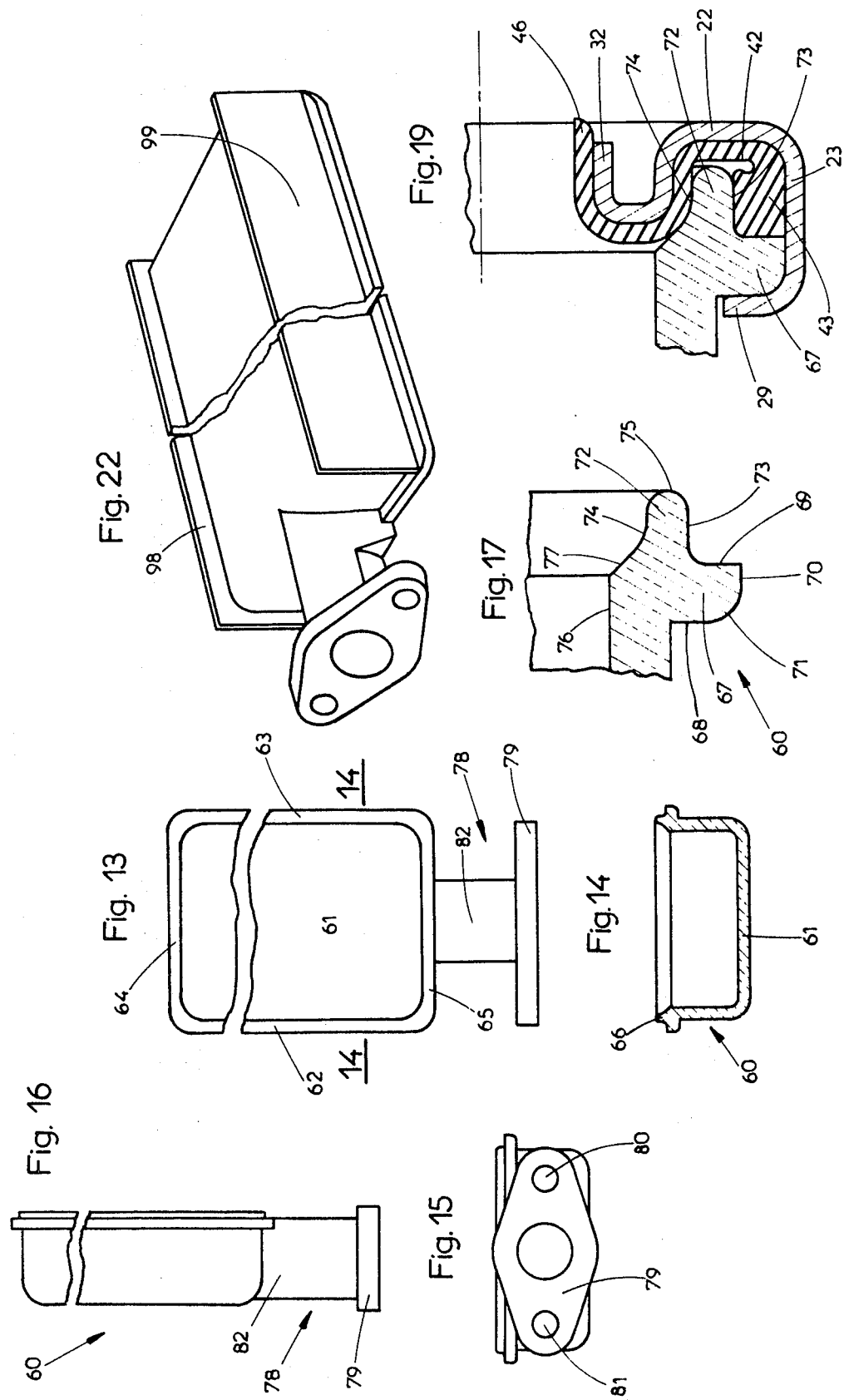

MULTITUBE RADIATOR

The invention relates to a multitube radiator of the type in which the tubes are mounted between two plates or manifolds defining covered fluid chambers or water tanks, to which pipes for the connection to the rest of the fluid circuit are connected. It applies particularly to multitube radiators intended for use in the air-conditioning systems of motor vehicles or for cooling engines.

It concerns multitube radiators which have a plurality, or bundle, of parallel tubes which pass through fins over which the secondary fluid - usually air - streams and so heat or cool it by heat exchange with a primary fluid - such as water - flowing in the tubes.

A general object of the invention is to simplify manufacture of a multitube radiator of this type and therefore to reduce its cost price.

A particular object of the invention is to provide a multitube radiator which can be manufactured using cheaper, more readily worked materials than those previously used, and whose properties are equal or superior to those of known radiators.

A further object of the invention is to provide a multitube radiator which can be manufactured using a particularly simple connecting operation for the connection between the tubes in the bundle and the manifold. Further objects are to provide a multitube radiator whose manifold is easy to attach to the water tank, and which is readily connected to the rest of the primary-fluid circuit.

According to the invention, the mounting of a tube in a manifold is carried out by means of a flexible, advantageously resilient seal.

Apart from the ease of assembly, the presence of seals of this type lengthens the life of the radiator as a result of its insensitivity to vibrations, which are absorbed.

In a radiator according to the invention, each manifold has at least one collar and the seal is a ring inserted between the tube and the collar, so that, to fix a tube, the seal is previously placed in the collar on the manifold, and the tube, having been passed through the ring seal, is increased in diameter, providing both a mechanical connection and a fluidtight seal.

An assembly method of this kind makes it possible to use various materials for the tubes which have high thermal conductivity (for better heat transfer at the fins) and are ductile (to permit increase in diameter), but which need not satisfy metallurgical requirements as regards attachment to the manifold. Such a material may advantageously be aluminum.

In one embodiment, that end of the tube projecting from the manifold has a complementary expanded portion, which gives a better locking effect and helps to give a perfect seal. This arrangement also enables the effects of the forces evolved by a primary fluid under pressure to be effectively counteracted.

According to an important feature of the invention, the various seals, for example of rubber or the like material, required for assembling the tubes in a bundle are formed in a sheet forming an integral element applied to the manifold proper, and this sheet is shaped in such a way as to contribute further to the fluidtight seal between the manifold and the water tank.

With an arrangement of this kind, tightness is ensured simply by a clamping operation between the manifold and the water tank. Since no welding is required, the water tank can be made from a wide range of materials, advantageously synthetic plastic material. Not only is the cost price less, but the water tank can be manufactured by moulding it integrally with the pipe connecting it to the rest of the fluid circuit.

According to a preferred embodiment, the water tank, made from mouldable synthetic plastic material, has built-in means for mounting the associated radiator in a fluidtight manner in the body of the air conditioning system, these means consisting of a simple, thin rib or the like obtained by moulding with the water tank.

The invention will be well understood from the following description given by way of example with reference to the accompanying drawings, in which:

FIG. 1 shows a radiator fin;
FIG. 2 is a section along line 2–2 in FIG. 1;
FIG. 3 is a general elevation of a radiator embodying the invention;
FIG. 4 shows the outer face of a manifold forming part of a radiator embodying the invention;
FIG. 5 is a section along line 5–5 in FIG. 4;
FIG. 6 is a view at right angles to FIG. 4;
FIG. 7 is a section along line 7–7 in FIG. 4;
FIG. 8 is similar to FIG. 7, but shows a variation;
FIG. 9 shows a sealing device forming part of a radiator embodying the invention;
FIG. 10 is a section along line 10–10 in FIG. 9;
FIG. 11 is a section along line 11–11 in FIG. 9;
FIG. 12 is a section, on a larger scale, through part of the sealing device;
FIG. 13 shows a water tank forming part of a radiator embodying the invention;
FIG. 14 is a section on line 14–14 in FIG. 13;
FIG. 15 is an end view of the water tank;
FIG. 16 is a view at right angles to that in FIG. 13;
FIG. 17 is a section, on a larger scale, through the edge of the water tank;
FIG. 18 is a diagrammatic section illustrating one phase in the assembly of a radiator embodying the invention;
FIG. 19 is a partial view, on a larger scale, of some components in the radiator after assembly;
FIG. 20 is a section taken in the zone in which the tubes are connected to a manifold;
FIG. 21 is a view similar to FIG. 20, but for a zone in which the tubes are connected to the other manifold; and
FIG. 22 is a perspective view of a water tank for a different embodiment.

A radiator embodying the invention has, in the conventional manner, parallel tubes forming a bundle in which the primary fluid flows and having fins over which the secondary fluid streams, the tubes being inserted between manifolds covered with water tanks or headers connected by pipes to the remainder of the primary fluid circuit.

In the radiator embodying the invention, the fins may be of a conventional type. Each fin is in the form of a thin sheet 10 (FIGS. 1, 2), for example of aluminum, having holes 11 bordered by collars 12 and designed to receive the tubes of the bundle. The holes 11 may be arranged along parallel rows, of which two are shown at 13 and 14. Each fin may have facets 15, 16 slightly inclined relative to each other (FIG. 2), in order, in a known manner, to improve heat transfer between the secondary fluid—viz. air—and the fin.

The bundle is formed of metal tubes 17 (FIG. 3), not necessarily of weldable material. The invention provides for the use of aluminum tubes or tubes made of an aluminum-based alloy, which are cheaper than copper tubes. The tube cross section may be circular or oval. In the latter case the dimension perpendicular to the direction of primary fluid flow should be smaller than that parallel to this direction.

A manifold (FIGS. 4–8) comprises a metal plate 20, preferably of ferrous metal, of which the body or end 21 is flat and has a raised edge 22, extended by a flange 23 perpendicular to the end 21 and to the edge 22. Recesses 24 form lugs 29 on the flange 23. The end 21 presents holes 31 bordered by collars 32, obtained for example by stamping.

In accordance with the invention, the manifold is lined with a sealing device in the form of a sheet 40 of rubber or the like material (FIGS. 9—12) conforming closely in shape to the manifold 20. These sheets 40 have an end 41 framed in a raised edge 42 which is extended by a flange 43 perpendicular to the edge 42 and end 41. The flange 43 has a moulding 44, the thickness of the sheet 40 being otherwise substantially uniform. The end 41 is formed with holes 45 surrounded by collars 46.

To assemble the sealing device and manifold, the sheet 40 of rubber or the like material is simply placed on the outer surface 25 of the manifold, with the edge 42 and flange 43 lodging in the recess defined by the edge 22 and the flange 23 on the manifold. The dimensions of this recess and the flange 43 are such that insertion requires slight pressure, which itself provides a satisfactory attachment of the sealing device to the manifold. The collars 46 on the seal are inside the associated collars 32 on the manifold.

Advantageously, the two manifolds for a radiator having a bundle of tubes, though identical in general shape and in arrangement, have one difference. The manifold shown in FIG. 7, which is for example the manifold for the left-hand end of the radiator shown in FIG. 3, is in contact - by way of the inner surface 26 of its edge 22 - with that face of the fin $10_1$ (FIG. 20) away from that from which the collars 12 project. By contrast, in the other manifold (FIG. 8), which is for the right-hand end of the radiator shown in FIG. 3, the edge 22' projects further from the end 21' than in the left-hand manifold, with the result that the edge of the collar 32' is misaligned relative to the face 26' of the edge 22. The right-hand fin $10_n$ (FIG. 21) therefore touches the face 26' at its edge, and its collars 12' are housed precisely because of the edge 22' projecting further relative to the end 21'.

The water tank or header (FIGS. 13—17) has the general shape of a parallelepipedal trough and comprises a body 60 with an end face 61, long side faces 62, 63 and short side faces 64, 65. The rim 66 of the tank has a peripheral bead 67, generally rectangular in cross section, with two parallel faces 68, 69 and a lateral face 70, the faces 68 and 70 being connected by a rounded portion 71. The rim 66 has an internal bead 72 with two parallel faces 73, 74 connected by a rounded portion 75. The face 74 is joined to the interior 76 of the tank by a slope 77.

In a preferred embodiment, the tank is advantageously made of synthetic plastic material and has a moulded pipe 78, with a flange 79 having holes 80, 81 and a tubular member 82 leading into the tank.

To assemble the radiator (FIGS. 3, 18), the tubes 17 in the bundle are threaded through the associated holes 11 in the fins 10, which have previously been stacked and are, for example, in a storage fitting. The tubes 17 are expanded by conventional means (passing an ogive through each tube or pressurizing a fluid inside the tubes, etc.) in order to clamp them onto the collars 12 on the fins 10. The tubes are covered at each end with the manifolds, each of which consists of a manifold proper lined with a seal 40 of rubber or the like material. Mandrels 90 (FIG. 18) are forced simultaneously into each end of each tube. The mandrel profile has a cylindrical bearing surface 91 followed by a conical bearing surface 92, a second cylindrical surface 93 and a second conical surface 94. Insertion is carried out by bringing the mandrels simultaneously towards each other. Each tube is expanded at each end so that it has a frustoconical portion 95, a cylindrical portion 96 and a second, outer frustoconical portion 97. Fluidtightness results from clamping of the rubber collar 46 between the manifold collar 32 and the cylindrical tube portion 96. The frustoconical portion 97 aids fluidtightness and also prevents the tube 17 from subsequently coming out of a manifold under the influence of a force exerted in the direction of the double arrow $f$, for example by a fluid under pressure inside the tube.

When the manifolds are in position, the edge of the first fin $10_1$ (FIG. 20) on the left touches the end 21 of the manifold 20. The edge of the sheet $10_n$ at the other end (FIG. 21), similarly, touches the face 21' of the manifold 20', although its collars face towards the right. There is therefore no excessively wide air gap.

The water tanks are then put on, simply by putting their edges against the associated manifolds 20, 20'. The internal bead 72 is forced into the gap at the periphery of the sealing device 40 (FIG. 19), crushing the cylindrical bead 43, and pressure occurs between this bead and the faces 73, 74 on the bead 72, so that fluidtightness is ensured. The projecting portions of the lugs 29 on the manifold flanges 23 are crimped over to hold the components together.

In the embodiment shown in FIG. 22, the water tank has one or more moulded ribs 98, 99 (and possibly a central rib also) provided for fluidtight mounting of the radiator equipped with the tank in an air-conditioning system of which the radiator forms part.

The invention covers embodiments in which the speed at which the water flows in the tubes of the bundle is increased by limiting the passage zone in these tubes to a peripheral portion, for example by inserting cores which are advantageously of synthetic plastic material and whose ends are closed. These cores may be moulded in one piece with the water tank.

The invention can be applied whatever the arrangement or number of the tubes in the bundle and whatever the direction of primary fluid flow in the tubes. In particular, it covers an embodiment having only two tubes, with a mounting of the pin type.

The water tank may be provided with moulded partitions for dividing the circuits.

I claim:

1. A heat exchanger comprising two opposed and spaced manifolds, each manifold including a sheet having a plurality of openings with an annular flange encircling each opening, and a single sheetlike gasket of substantial flexible material urged against each manifold and having openings corresponding to the openings in said sheet and including a plurality of projecting annular flanges internally lining the flanges of said sheet, a plurality of tubes extending between said sheets and sealingly inserted into said annular flanges of the gaskets for the passage of a thermal fluid, each tube including end portions which are sealingly inserted into the annular flange of the associated gasket and include respective tubular end sections of greater diameter than the respective remaining portion of the tubes and further flared sections stemming from respective end sections outwardly over said sheetlike gaskets to crimp the same between the tube and the sheets, and a plurality of fins secured on said tubes, and two headers in sealed engagement with said sheets for defining two fluid chambers respectively connectable to an inlet and an outlet of said heat exchanger.

2. The heat exchanger of claim 1, wherein each gasket has an external edge and includes a rim defining a peripheral recess, said headers each having an edge corresponding in shape to the recess of the associated gasket and engaged in tight sealing engagement therein.

3. The heat exchanger of claim 1, wherein said tubes are aluminum or aluminum alloys.

4. The heat exchanger of claim 2, wherein said sheets each include a peripheral flange in the form of a tongue having ends bent around a rib provided on the associated header for assuring the sandwiching of said rim between said sheet and said header.

5. The heat exchanger of claim 1 further comprising a core inside at least some of said tubes limiting the flow of thermal fluid to the outer periphery of said tubes, said core being integrally molded with said header.

6. The heat exchanger of claim 1, wherein said header further comprises at least one tongue-shaped means molded integrally therewith for connectingly assembling said heat exchanger with an ancillary system.